(12) United States Patent
Alleyne et al.

(10) Patent No.: US 12,505,040 B2
(45) Date of Patent: Dec. 23, 2025

(54) SYSTEMS AND METHODS FOR CACHE FILTERING

(71) Applicant: Nokia Solutions and Networks Oy, Espoo (FI)

(72) Inventors: Brian Alleyne, Los Gatos, CA (US); Bartosz Barakonski, Sunnyvale, CA (US); Hengwei Hsu, Fremont, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/355,571

(22) Filed: Jul. 20, 2023

(65) Prior Publication Data

US 2025/0028638 A1    Jan. 23, 2025

(51) Int. Cl.
| | | |
|---|---|---|
| *G06F 12/0802* | (2016.01) | |
| *G06F 12/0864* | (2016.01) | |
| *G06F 12/0888* | (2016.01) | |
| *G06F 12/0895* | (2016.01) | |

(52) U.S. Cl.
CPC ...... *G06F 12/0802* (2013.01); *G06F 2212/60* (2013.01)

(58) Field of Classification Search
CPC ............ G06F 12/0802; G06F 2212/60
USPC ........................................... 711/118
See application file for complete search history.

(56) References Cited

U.S. PATENT DOCUMENTS

| | | | | |
|---|---|---|---|---|
| 10,372,615 | B1* | 8/2019 | Svendsen ............ | G06F 12/0875 |
| 2004/0030839 | A1* | 2/2004 | Southwell ........... | G06F 12/0862 |
| | | | | 711/128 |
| 2004/0143708 | A1* | 7/2004 | Caprioli ................ | G06F 12/124 |
| | | | | 711/E12.074 |
| 2014/0143505 | A1 | 5/2014 | Sim et al. | |
| 2015/0134916 | A1* | 5/2015 | Padalikar ............ | G06F 12/0888 |
| | | | | 711/138 |
| 2016/0267072 | A1* | 9/2016 | Kappler ................ | G06F 40/166 |
| 2017/0154181 | A1* | 6/2017 | Venkataramani ..... | G06F 21/566 |
| 2017/0262767 | A1* | 9/2017 | Mahyar ................ | H04L 67/1017 |
| 2018/0232310 | A1 | 8/2018 | Chang et al. | |
| 2019/0155750 | A1 | 5/2019 | Wang et al. | |

OTHER PUBLICATIONS

European Search Report from corresponding European Application No. 24188838.7, dated Oct. 14, 2024.

* cited by examiner

*Primary Examiner* — Ryan Bertram
*Assistant Examiner* — Sidney Li
(74) *Attorney, Agent, or Firm* — Harness, Dickey & Pierce, P.L.C.

(57) ABSTRACT

A method for filtering addresses from a cache includes receiving, by a filter, a data request including an address specifying a memory location of the requested data, querying the filter to determine whether the address is cacheable or non-cacheable, and in response to determining the address is non-cacheable, preventing caching of the data and the address associated with the data. Other example methods, systems and non-transitory computer readable mediums for filtering addresses from a cache are also provided.

21 Claims, 5 Drawing Sheets

SYSTEMS AND METHODS FOR CACHE FILTERING

TECHNICAL FIELD

One or more example embodiments relate to systems, methods and/or non-transitory computer-readable storage mediums for cache filtering.

BACKGROUND

A computing system often includes a cache and a main memory. The cache is memory implemented with hardware and/or software for providing recently and/or more frequently accessed data to a requester in or associated with the computer system. When data is requested, the cache is queried to see if the requested data is available. If so, the data is retrieved and provided to the requester. This scenario is often referred to as a "cache hit." If the requested data is not found in the cache (e.g., referred to as a "cache miss"), the data is retrieved from the main memory and provided to the requester. In such scenarios, the requested data found in the main memory may be copied into the cache (e.g., cached). If the cache is full, other data in the cache is evicted to make space for the new data.

The eviction of data in the cache may be determined according to different replacement or caching algorithms. For example, the eviction of data in the cache may be based on a least frequency used algorithm which tracks how often data is accessed and then evicts the entry with the lowest count first. Other algorithms include a least recently used algorithm which evicts the least recently accessed entry first, and a most recently used algorithm which evicts the most recently accessed entry first.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

According to one or more example embodiments, a system is provided for filtering addresses from a cache memory. The system comprises a filter in communication with a memory. The filter includes a filter data structure. The filter is configured to receive a data request including an address specifying a memory location of the requested data, query the filter data structure to determine whether the address is cacheable or non-cacheable, and in response to determining the address is non-cacheable, prevent caching of the data and the address associated with the data.

In various embodiments, the system may include the cache memory and a cache controller in communication with the cache memory. The cache controller may be configured to receive the data request including the address, query the cache memory to determine whether the cache memory includes the address, and update a cache state of the cache memory based on the received data request in response to determining the address is present in the cache memory. Additionally and/or alternatively, the cache controller may be configured receive the data request including the address, query the cache memory to determine whether the cache memory includes the address, and cache the data and the address into the cache memory in response to determining the address is not present in the cache memory and the address being cacheable.

In various embodiments, the filter may be configured to compare the address associated with the received data request to a set of addresses in the filter data structure, identify the address as cacheable in response to the address matching one of the set of addresses, and identify the address as non-cacheable in response to the address not matching any address of the set of addresses.

In various embodiments, the filter may be a bloom filter.

In various embodiments, the filter may be configured to insert the address of the received data request into the filter data structure.

In various embodiments, the filter may be configured to determine a number of addresses in the filter data structure and clear the addresses from the filter data structure in response to the number of addresses exceeding a defined threshold.

In various embodiments, the filter data structure includes a bit array having bit values, and the filter may be configured to generate hashed values of the address based on a plurality of hash functions and set a bit value of the bit array associated with each hashed value to one.

In various embodiments, the filter may be configured to determine a fill level of the bit array, and clear at least portion of the bit values of the bit array to zero in response to the fill level exceeding a defined threshold.

At least one other example embodiment provides a method for filtering addresses from a cache, comprising receiving, by a filter, a data request including an address specifying a memory location of the requested data, querying the filter to determine whether the address is cacheable or non-cacheable, and in response to determining the address is non-cacheable, preventing caching of the data and the address associated with the data.

In various embodiments, the method may further comprise receiving, by the cache, the data request including the address, querying the cache to determine whether the cache includes the address, and updating a cache state of the cache based on the received data request in response to determining the address is present in the cache.

In various embodiments, the method may further comprise receiving, by the cache, the data request including the address, querying the cache to determine whether the cache includes the address, and caching the data and the address into the cache in response to determining the address is not present in the cache and the address is cacheable.

In various embodiments, querying the filter to determine whether the address is cacheable or non-cacheable may include comparing the address associated with the received data request to a set of addresses in the filter, identifying the address as cacheable in response to the address matching one of the set of addresses, and identifying the address as non-cacheable in response to the address not matching any address of the set of addresses.

In various embodiments, the method may further comprise inserting the address associated with the received data request into the filter.

In various embodiments, inserting the address associated with the received data request into the filter may include inserting the address into the filter in response to preventing caching of the data and the address associated with the data.

In various embodiments, the method may further comprise determining a number of addresses in the filter and clearing the addresses from the filter in response to the number of addresses exceeding a defined threshold.

In various embodiments, the filter includes a bit array having bit values, and inserting the address associated with the received data request into the filter may include generating hashed values of the address based on a plurality of hash functions and setting a bit value of the bit array associated with each hashed value to one.

In various embodiments, the method may further comprise determining a fill level of the bit array and clearing at least portion of the bit values of the bit array to zero in response to the fill level exceeding a defined threshold.

At least one other example embodiment provides a non-transitory computer readable medium storing computer readable instructions, which when executed by processing circuitry, causes the processing circuitry to receive a data request including an address specifying a memory location of the requested data, query a filter to determine whether the address associated with the received data request is cacheable or non-cacheable, and in response to determining the address is non-cacheable, prevent caching of the data and the address associated with the data.

In various embodiments, the processing circuitry may be further caused to query the cache to determine whether the cache includes the address and update a cache state of the cache based on the received data request in response to determining the address is present in the cache.

In various embodiments, the processing circuitry may be further caused to query the cache to determine whether the cache includes the address and cache the data and the address into the cache in response to determining the address is not present in the cache and the address is cacheable.

At least one other example embodiment provides a system for filtering addresses from a cache memory. The system comprises means for caching data and addresses associated with the data, and means for receiving a data request including an address specifying a memory location of the requested data, querying a filter (e.g., a filter data structure) to determine whether the address is cacheable or non-cacheable, and in response to determining the address is non-cacheable, preventing the data and the address associated with the data from being cached.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
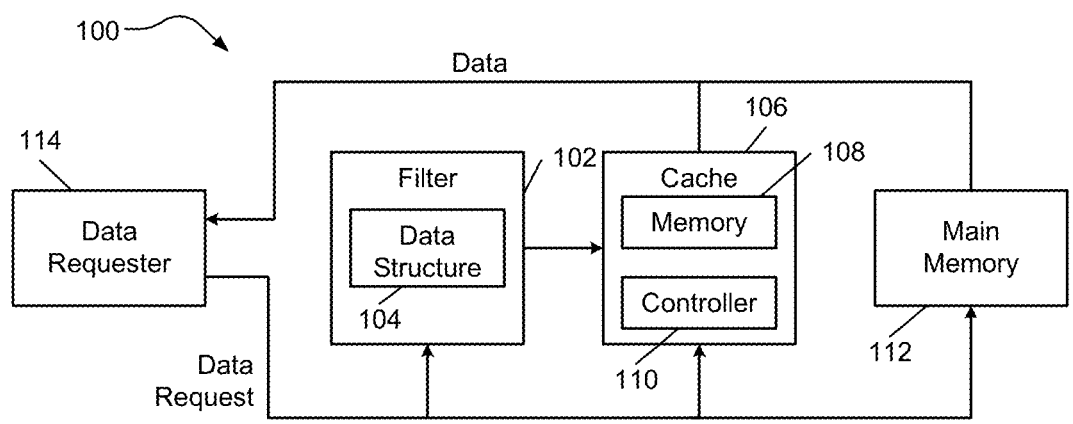
FIG. 1 is a block diagram of a computing system including a cache and a filter for filtering addresses from the cache according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure.

It will be appreciated that a number of example embodiments described herein may be used in combination.

Computing systems often include a cache and a main memory. In some cases, the cache may be polluted with little used data. For example, in traditional cache implementations, requested data passes to the cache indiscriminately even if the data is rarely used or never going to be used again. This can result in a cache entry being evicted before yielding any cache hits based on traditional cache replacement algorithms. As such, with traditional cache implementations, space in the cache may be wasted on little used data, thereby diminishing cache performance and increasing cache power consumption.

The computing systems, methods and non-transitory computer-readable storage mediums, according to one or more example embodiments of the present disclosure, effectively filter data entries from a cache by preventing the cache from caching entries unlikely to be needed in the near future. In various embodiments, and as further explained herein, the systems and methods may employ filters with data structures for summarizing addresses associated with data that have been seen in the past to select data entries to copy and/or not copy into the cache. For example, a cache filter may be employed to receive a data request including an address specifying a memory location of the requested data, query a filter data structure to determine whether the address is cacheable or non-cacheable, and in response to determining the address is non-cacheable, prevent an associated cache from caching the data and the address associated with the data. In this manner, the filter may effectively prevent the cache from being polluted with little used data. As a result, the cache may be more effective for its size, thereby reducing the amount of data written into the cache by, for example, up to ninety percent. In turn, the cache may experience improved (e.g., significantly improved) cache performance and/or reduced power consumption as compared to traditional cache implementations.

FIG. 1 illustrates an example computing system 100 for filtering addresses from a cache according to at least one example embodiment. As shown in FIG. 1, the computing system 100 includes a filter 102, a cache 106 for caching data and specific addresses associated with the data, a main memory 112, and a data requester 114 in communication with the filter 102, the cache 106 and the main memory 112. The filter 102 includes a data structure 104, and the cache 106 includes a cache memory 108 and a cache controller 110. In various embodiments, the system 100 may include and/or be associated with one or more suitable computing devices, including routers, switches, computers, etc. for receiving and/or processing data. While the system 100 of FIG. 1 is shown as including one data requester, one filter, one cache and one main memory, it should be appreciated that the system 100 may include multiple data requesters, filters, caches and memories if desired. Additionally, although FIG. 1 shows the controller 110 as being a part of the cache 106, it should be appreciated that the controller 110 may be external to the cache 106 and/or a portion of another controller in the system 100 if desired.

In various embodiments, the data requester 114 may transmit data requests to the filter 102, the cache 106, and/or the main memory 112. In such examples, each data request may include an address specifying a memory location of the requested data. For example, the filter 102 of FIG. 1 may receive one or more data requests from the data requester 114. In turn, the filter 102 may insert an address provided with each data request into the data structure 104.

The data requester 114 of FIG. 1 and/or other data requesters herein may be any suitable cache client that requests data. For example, the data requester 114 may be one or more controllers (e.g., a CPU, etc.), software applications, state machines, operating systems, web browsers, etc.

In various embodiments, the filter 102 may query the filter data structure 104 to determine whether the address in a received data request is cacheable or non-cacheable in the cache 106 (e.g., in the cache memory 108). For example, the filter 102 may compare the address associated with the received data request to previously inserted addresses (e.g., a set of addresses) in the filter data structure 104. If the new address matches one of the previously inserted addresses, the filter 102 may identify the address as cacheable. In such examples, because the address has been seen by the filter 102 and inserted into the filter data structure 104, the address will likely yield cache hits with respect to the cache memory 108. As such, in cases where the address is requested multiple times (e.g., twice, etc.) within a short period of time, that address will likely keep repeating in the future. This may commonly occur in, for example, an elephant flow scenario.

However, if the new address does not match any of the previously inserted addresses, the filter 102 may identify the address as non-cacheable. For example, the filter 102 may insert previously seen addresses into the data structure 104. If the address is not present in the data structure 104, the new address is identified as non-cacheable as the new address may yield cache misses with respect to the cache memory 106. While the new address may be deemed non-cacheable, the filter 102 may proceed to insert the new address into the filter data structure 104. As such, if the new address is seen again (e.g., in a subsequent data request from the data requester 114), the filter 102 may then identify the address as cacheable.

The filter 102 may then prevent the cache 106 from caching the data and the associated address in response to determining the address is non-cacheable. For example, the filter 102 may generate a signal indicating a particular address is non-cacheable, and then transmit that signal to the cache 106 (e.g., the cache controller 110). In response to the signal, the cache controller 110 may not cache the particular address and data in the cache memory 108 when the address is not in the cache memory 108 and/or not update a cache state of the cache memory 108 when the address is in the cache memory 108.

In such examples, the cache 106 may cache the address and associated data if the non-cacheable signal is not received. For example, and as explained herein, the cache 106 may receive a data request from the data requester 114 and determine that the received address is not present in the cache memory 108 (e.g., a cache miss). In such scenarios, the cache controller 110 may communicate with the main memory 112 and cache the data and address into the cache memory 108 if a non-cacheable signal associated with that address is not received within a defined period of time of receiving the data request.

In some embodiments, the filter 102 may generate and transmit a signal to the cache 106 for a particular address regardless of whether the address is non-cacheable or cacheable. For example, when an address is received with a data request, the filter 102 may set a cacheable value associated with the address to one (e.g., a default value). If the filter 102 determines the address is cacheable, the cacheable value remains unchanged (e.g., remains at one). However, in response to determining that the address is non-cacheable, the filter 102 may change the cacheable value associated with the address to zero to signify the non-cacheable event. The filter 102 then passes the signal with the cacheable value of one or zero to the cache 106 (e.g., the cache controller 110). In response to the signal having the cacheable value of one, the cache controller 110 may cache the address and data in the cache memory 108 and/or update a cache state of the cache memory 108 when the address is in the cache memory 108. Alternatively, the cache controller 110 may not cache the address and data and/or not update a cache state of the cache memory 108 if the cacheable value is zero.

In various embodiments, the filter 102 may be any suitable type of filter having and/or associated with a data structure for tracking addresses and detecting address repetitions. For example, the filter 102 may be implemented with a bloom filter, a cuckoo filter, a ternary content addressable memory (TCAM) filter, a filter having an associated dictionary data structure, etc. In such examples, a bloom filter may insert multiple hashed values of each received address (as further explained below) and therefore need a few bits of data per address. However, due to the multiple hashed values for each address, the bloom filter may provide false positives when the filter is queried as further explained below. Different than the bloom filter, a TCAM filter may insert actual addresses (instead of hashed values) and therefore use more bits of data per address than the bloom filter. Additionally, the dictionary data structure may use more bits of data per address than the bloom filter, but rarely provide false positives. While an example of the filter 102 is explained below with respect to a bloom filter, it should be appreciated that any other suitable type of filter (e.g., a TCAM filter, a cuckoo filter, a dictionary data structure, etc.) may be employed without departing from the scope of the disclosure.

For example, when employed, a bloom filter may provide a sufficient indication as to whether an address has been seen recently or not. In some examples, the bloom filter may function in a conventional manner. For example, the bloom filter may include a space efficient and probabilistic data structure (e.g., the data structure 104) that uses hash functions for inserting entries into a bit array of the data structure. More specifically, the bloom filter may be represented by a set $A=\{a_1, a_2, \ldots, a_n\}$ of n elements using an m-bit array and a set of K cryptographic hash functions $H=\{h_1, h_2, \ldots, h_k\}$. In such examples, the elements may correspond to inserted addresses.

For instance, bit values of the bit array in the data structure may be initially set to zero. When the bloom filter receives an address (a) for insertion into the data structure, the filter may generate hash values of that address (a) based on multiple hash functions (e.g., the set of cryptographic hash functions or a set of circular redundancy check (CRC) functions). In such examples, each hash function ($h_1$, $h_2$, ..., $h_k$) may receive the address (a) as an input and generate a hashed value ($h_1(a), h_2(a), \ldots, h_k(a)$) within a range based on a defined size of the bit array (e.g., a range [1 to m] of the m-bit array). Then, the bloom filter may set a bit value of the bit array associated with each hashed value to one, thereby inserting the address (a) into the data structure. For example, if one hash function ($h_1$) generates a hashed value of two based on the address (a), the bit value at the second index position in the bit array is set to one. Likewise, if another hash function ($h_2$) generates another hashed value of four based on the address (a), the bit value at the fourth index position in the bit array is also set to one.

The bloom filter repeats such functions for each received address. For example, when the bloom filter receives another address ($a_2$) for insertion into the data structure, the filter generates a hashed value of that address ($a_2$) based on each hash function and then sets a bit value of the bit array associated with each hashed value to one, as explained above. For example, if the hash function ($h_1$) generates a hashed value of three based on the address ($a_2$), the bit value at the third index position in the bit array is set to one. If the bit array is already set to one due to another inserted address, the bit value remains one. For instance, a hash function may generate a hashed value of four based on the address ($a_2$). In such cases, the bit value at the fourth index position is already set to one due to the inserted address (a) and therefore does not change.

The bloom filter may also query for the address (a) in the data structure to determine whether the address is cacheable or non-cacheable. For example, after a hashed value is generated by each hash function based on the address (a), the hashed values may be compared against the values at the index positions in the bit array. For example, if one hash function ($h_1$) generates a hashed value of two based on the address (a) as explained above, the value (zero or one) at the second index position in the bit array may be employed to determine whether the address is cacheable or non-cacheable. This may be done for each generated hashed value for the address (a) and its associated value at the index position. If all of the values at the index positions are set to one, then the address (a) is an element in the set A (e.g., a E A). In other words, the address (a) has most likely been previously seen by the bloom filter and inserted into the filter data structure as explained above. In such examples, the address (a) may be identified as cacheable. If, however, any of the values at the index positions is zero, then the address (a) is not an element in the set A (e.g., a € A). In such cases, the address (a) may be identified as non-cacheable. The bloom filter may then prevent the cache 106 from caching the data and the associated address in response to determining the address is non-cacheable, as explained herein.

With continued reference to FIG. 1, the filter 102 may have a probability of false positive hits associated with addresses received in data requests. This may be particularly true with respect to bloom filters and/or other similar functioning filters. For example, when a bloom filter is employed, a false positive hit may occur if all index positions corresponding to the particular address (a) are set to one due to other addresses (not a) being inserted into the array. In such examples, the bloom filter may indicate that the address (a) is an element in the set A and therefore cacheable even though the address (a) was not previously inserted into the array. In such examples, the probability of false positive hits generally increases as the number of addresses stored in the bloom filter increases. As such, it may be desirable in some embodiments to control a filter fill level to reduce the chances of false positive hits.

In various embodiments, the filter 102 may implement a maintenance strategy to control its fill level. For example, the filter 102 may clear all or a portion of the addresses, bit values associated with the addresses, etc. from the filter data structure 104 when a defined period of time is met. In such examples, the defined period of time may be 100 microseconds, one second, two seconds, three seconds, and/or another suitable period based on the cache size, a desired number of stored addresses, etc. In other examples, the filter 102 may determine a number of addresses in the filter data structure 104, and then clear all or a portion of the addresses from the filter data structure 104 in response to the number of addresses exceeding a defined threshold. In such examples, the number of addresses may be determined by, for example, summing the inserted addresses. Once the determined number of addresses exceeds the defined threshold, all or a portion of the addressed may be removed from the data structure 104. In such examples, the defined threshold may be based on the cache size, a desired number of stored addresses, etc. For example, the defined threshold may be 10,000 addresses, 15,000 addresses, 20,000 addresses, 25,000 addresses, 30,000 addresses, more than 30,000 addresses, less than 10,000 addresses, etc.

In other examples, the maintenance strategy may be based on a fill level of a bit array when, for example, a bloom filter or another similar functioning filter is employed. For example, when a bloom filter is employed, the bloom filter inserts an address into its filter data structure by setting a bit value of an index position in the bit array associated with each hashed value to one, as explained above. In such examples, the number of ones in the bit array corresponds to the fill level of the bit array. In connection therewith, the bloom filter may determine a fill level of the bit array in the data structure (e.g., the data structure 104), and then clear all or a portion of the bit values of the bit array to zero in response to the fill level exceeding a defined threshold. In such examples, the defined threshold may be based on, for example, any desired number of stored addresses, the number of hash functions employed, the cache size, etc.

With continued reference to FIG. 1, the filter 102 and/or the cache 106 may be partially or fully implemented in hardware. For example, the data structure 104 and/or the cache memory 108 may be a data structure on one or more chips, such as a chip associated with and/or in communication with the data requester 114. In some examples, the cache memory 108 may be referred to as high-speed static random access memory (SRAM). In other examples, the filter 102 and/or the cache 106 may be partially or fully implemented in software (e.g., software managed filter and/or cache).

Regardless of whether the cache 106 is implemented in hardware and/or software, the cache 106 may temporarily store and provide recently and/or frequently accessed data to the data requester 114, update a cache state, etc. For example, the cache controller 110 may receive the data request including the address from the data requester 114 as explained above, and then query the cache memory 108 to determine whether the cache memory 108 includes the received address. If the received address is present in the cache memory 108 (e.g., a cache hit), the cache controller 110 may provide the data associated with the address to the data requester 114. In response to determining the address is present in the cache memory 108, the cache controller 110 may update a cache state of the cache memory 108 based on the received data request. This may impact when the address and data associated with the cache hit are evicted from the cache 106 depending on the particular replacement or caching algorithm employed by the cache controller 110.

In other scenarios, the cache controller 110 may determine that the received address is not present in the cache memory 108 (e.g., a cache miss). In such scenarios, the main memory (e.g., dynamic random access memory (DRAM)) 112 may provide the data associated with the address to the data requester 114. Additionally, in response to the received address not being present in the cache memory 108, the cache controller 110 may communicate with the main memory 112 and cache the data and address into the cache memory 108 if the address is deemed cacheable by the filter 102 (as explained herein). For example, if the received address is not present in the cache memory 108 and the address is cacheable, the cache controller 110 may receive the data and associated address from the main memory 112 and insert such information into the cache memory 108.

Although the above examples are described with respect to the filter 102 and the cache 106 being implemented in hardware, it should be appreciated that similar functions may be accomplished by the filter 102 and/or the cache 106 when implemented in software. For example, when implemented in software, the cache 106 may receive the data request including the address and then determine whether the address is included in the cache. In such examples, the cache 106 may then update a cache state, cache the data and address, etc. as explained above. Such embodiments and other embodiments discussed herein may be performed by one or more processors (or processing circuitry) at an applicable device. For example, according to one or more example embodiments, at least one memory may include or store computer readable instructions that, when executed by at least one processor, cause the processor or the applicable device to perform one or more operations discussed herein.

Figure 2:
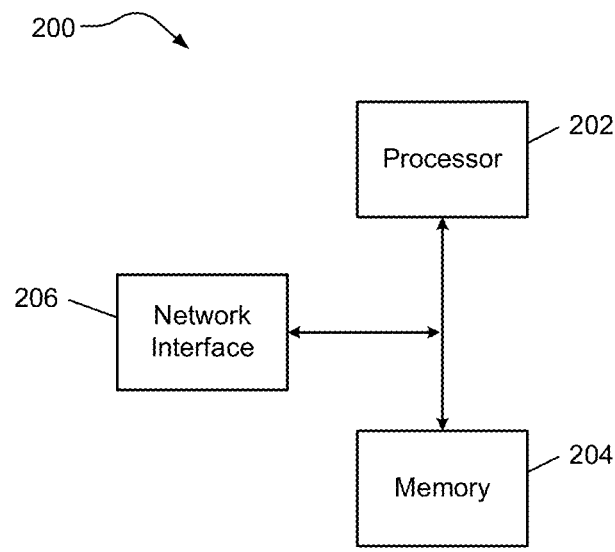
FIG. 2 is a block diagram of an example computing device of the system of FIG. 1 according to example embodiments.

For example, FIG. 2 illustrates an example embodiment of a device 200 that may implement functions of the data requester 114, the filter 102 and/or the cache 106 of FIG. 1. As shown in FIG. 2, the device 200 includes a processor (e.g., processing circuitry) 202, memory 204 connected to the processor 202, and a network interface 206 for transmitting/receiving data from/to other network devices, systems, etc. As will be appreciated, depending on the implementation of the device 200, the device may include more components than those shown in FIG. 2 including one or more additional processors, memory, network interfaces, etc.

In the example of FIG. 2, the memory 204 may be a computer readable storage medium that generally includes a random access memory (RAM), read only memory (ROM), and/or a permanent mass storage device, such as a disk drive. The memory 204 may also store an operating system and any other routines/modules/applications for providing the functionalities of the device to be executed by the processor 202. These software components may also be loaded from a separate computer readable storage medium into the memory 204 using a drive mechanism (not shown). Such separate computer readable storage medium may include a disc, tape, DVD/CD-ROM drive, memory card, or other like computer readable storage medium (not shown). In some example embodiments, software components may be loaded into the memory 204 via the interface 206.

The processor 202 may be configured to carry out computer executable instructions of a computer program by performing the arithmetical, logical, and input/output operations of the system. Instructions may be provided to the processor 202 by the memory 204.

Figure 3:
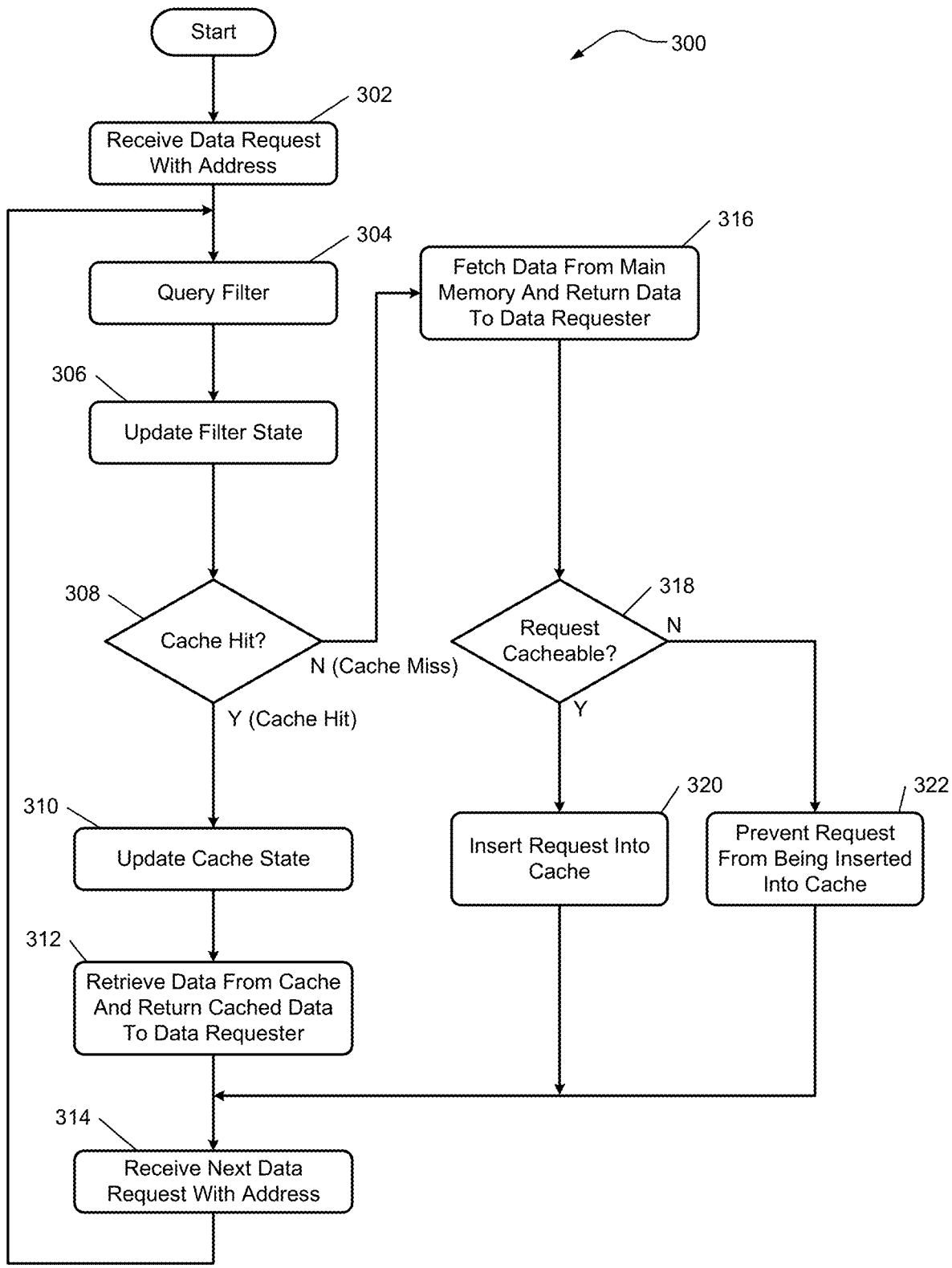
FIG. 3 is a flow diagram of a control method for filtering addresses from a cache according to example embodiments.

FIG. 3 illustrates a control method 300 for filtering addresses from a cache according to at least one example embodiment. In various embodiments, the example control method 300 may represent a "filter before cache" scenario in which a filter may be independent from the cache. In such examples, no feedback is provided from the cache to the filter. As further explained below, the control method 300 of FIG. 3 generally includes, for example, querying the filter to determine a cacheability of an address, updating a filter state, querying the cache (e.g., resulting in either a cache hit or a cache miss), and inserting the address and associated data into the cache or preventing the insertion of the address and associated data based on the determined cacheability of the address and the cache query.

As shown, the method 300 begins at 302 where a data request with an address from a data requester (e.g., a processor, etc.) is received by the cache and the filter, such as a bloom filter or another suitable filter as explained herein. Control then proceeds to 304.

At 304, the filter queries for the address of the received data request. For example, previously seen addresses or representations thereof may be inserted into the filter as explained above. The filter may search for the newly received address to see if the address was previously inserted. For instance, the filter may compare the newly received address or one or more representations thereof to previously inserted addresses (e.g., a set of addresses). In various embodiments, a cacheability attribute (e.g., a cacheable value) associated with the address may be determined and stored until needed. For example, the filter may identify the address as cacheable if the new address matches one of the previously inserted addresses. In such examples, the filter may set the attribute associated with the address to one (e.g., a default value) or maintain the attribute at one if the address is cacheable. Alternatively, if the new address does not match one of the previously inserted addresses in the filter, the address is not cacheable and the filter may set the attribute associated with the address to zero or maintain the attribute at zero. Control then proceeds to 306.

At 306, the filter state is updated. For example, the filter may insert the address of the received data request into the filter. In such examples, the filter may insert the address if, for example, the address is not present in the filter. Control then proceeds to 308.

At 308, control queries the cache for the address of the received data request to determine whether the address is present therein. For example, the cache may determine whether the address is stored therein by implementing conventional methods. If the address is present in the cache (e.g., a cache hit), control proceeds to 310. If the address is not present in the cache (e.g., a cache miss), control proceeds to 316.

At 310, control updates a cache state of the cache associated with the address. For example, the internal cache state may be updated according to the particular replacement or caching algorithm (e.g., a least recently used (LRU) algorithm, etc.) employed by the cache. In turn, this may impact when the address and data associated with the cache hit are evicted from the cache. Control then proceeds to 312.

At 312, control retrieves the requested data from the cache and returns the cached data to the data requester. In various embodiments, the retrieval and return of the requested data may be implemented through conventional methods. Control then proceeds to 314, where the next data request from the data requester is received. Control then returns to 304.

As explained above, if the address is not present in the cache as determined at 308, control proceeds to 316. At 316, control fetches the requested data from a main memory (e.g., the main memory 112 of FIG. 1) and returns the data to the data requester. In various embodiments, the retrieval and return of the requested data from the main memory may be implemented through conventional methods. Control then proceeds to 318.

At 318, control may determine whether the address of the received data request is cacheable if, for example, the cacheability has not already been determined at 304. For example, if the cacheability attribute associated with the address is determined at 304, the received data request may be deemed cacheable (e.g., previously deemed cacheable at 304). If not, the received data request may be deemed not cacheable. In other examples, the filter may identify the address as non-cacheable if the new address does not match one of the previously inserted addresses in the filter, as explained above. The filter, however, may identify the address as cacheable if the new address does match one of the previously inserted addresses. If the address is determined to be cacheable at 318 (or at 304), control proceeds to 320. If, however, the address is determined to be not cacheable at 318 (or at 304), control proceeds to 322.

At 320, control inserts the address and associated data into the cache. In such examples, the cache may insert the address if the cacheable value associated with the address is at a defined value (e.g., one, etc.). In various embodiments, the insertion of the cacheable address and associated data may be implemented through conventional methods. Control then proceeds to 314, where the next data request from the data requester is received as explained above.

At 322, control prevents the request from being inserted into the cache. For example, the cache may be prevented from caching the address and data associated with that address if the cacheable value of the address is at another defined value (e.g., zero, etc.) as explained above. Control then proceeds to 314, where the next data request from the data requester is received as explained above.

Figure 4:
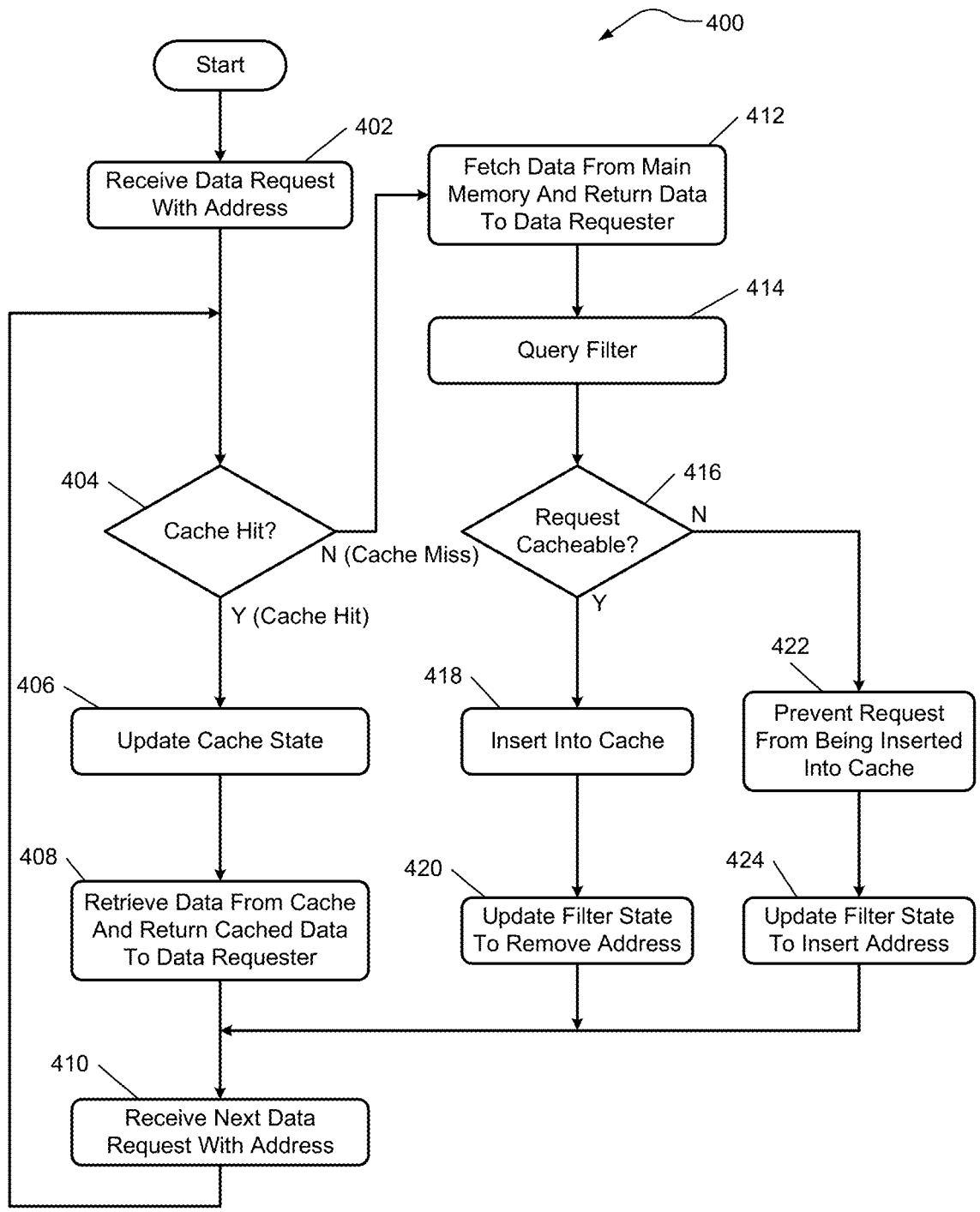
FIG. 4 is a flow diagram of another control method for filtering addresses from a cache according to example embodiments.

FIG. 4 illustrates another control method 400 for filtering addresses from a cache according to at least one example embodiment. In various embodiments, the example control method 400 may represent a "cache lookup before filter update" scenario in which a filter state update may be dependent on a cache lookup result. As further explained below, the control method 400 of FIG. 4 generally includes, for example, querying the cache (e.g., resulting in either a cache hit or a cache miss), querying the filter to determine a cacheability of an address, inserting the address and associated data into the cache or preventing the insertion of the address and data based on the determined cacheability of the address and the cache query, and updating a filter state based on the cache query. In such examples, if a cache miss scenario occurs with respect to an address, that address is inserted into the filter. If, however, a cache hit scenario occurs with respect to the address, the address is removed from the filter. With this implementation, the filter may be prevented from being polluted with addresses currently stored in the cache.

As shown, the method 400 begins at 402 where a data request with an address from a data requester is received by the filter and the cache, as explained herein. In such examples, the filter may be a bloom filter or another suitable filter as explained herein. Control then proceeds to 404.

At 404, control determines whether the address of the received data request is present in the cache by querying the cache for the address. For example, the cache may determine whether the address is stored therein by implementing conventional methods. If the address is present in the cache (e.g., a cache hit), control proceeds to 406.

At 406, control updates a cache state of the cache associated with the address. For example, and as explained above, the internal cache state may be updated according to the particular replacement or caching algorithm employed by the cache. Control then proceeds to 408.

At 408, control retrieves the requested data from the cache and returns the cached data to the data requester. In various embodiments, the retrieval and return of the requested data may be implemented through conventional methods. Control then proceeds to 410, where the next data request from the data requester is received. Control then returns to 404.

If the address is not present in the cache as determined at 404, control proceeds to 412. At 412, control fetches the requested data from a main memory and returns the data to the data requester as explained above. The retrieval and return of the requested data from the main memory may be implemented through conventional methods. Control then proceeds to 414.

At 414, the filter queries for the address of the received data request as explained above. For example, previously seen addresses or representations thereof may be inserted into the filter as explained above. The filter may search for the newly received address to see if the address was previously inserted as explained above. Control then proceeds to 416.

At 416, control determines whether the address of the received data request is cacheable. For example, if the new address matches one of the previously inserted addresses in the filter, the filter may identify the address as cacheable (e.g., set a cacheable value of the address to a first value), as explained above. If, however, the new address does not match one of the previously inserted addresses in the filter, the filter may identify the address as non-cacheable (e.g., set a cacheable value of the address to a second value), as explained above. If the address is determined to be cacheable at 416, control proceeds to 418.

At 418, control inserts the address and associated data into the cache. In such examples, the cache may insert the address if the cacheable value associated with the address is at a defined value as explained above. In various embodiments, the insertion of the cacheable address and associated data may be implemented through conventional methods. Control then proceeds to 420.

At 420, control may update a filter state of the filter associated with the address based on, for example, the insertion of the address into the cache. For example, in response to determining the address is cacheable at 416 and/or inserting the address into the cache at 418, control may remove the address from the filter. As such, in this example, the filter is prevented from being polluted with an address already inserted in the cache. Control then proceeds to 410, where the next data request from the data requester is received as explained above.

If the address is determined to be not cacheable at 416, control proceeds to 422. At 422, control prevents the request from being inserted into the cache as explained herein. Control then proceeds to 424.

At 424, control may update a filter state of the filter associated with the address according to not inserting the address into the cache. For example, in response to determining the address is not cacheable at 416 and/or preventing the requested address from being inserted into the cache at 422, control may insert the address into the filter. Control then proceeds to 410, where the next data request from the data requester is received as explained above.

Figure 5:
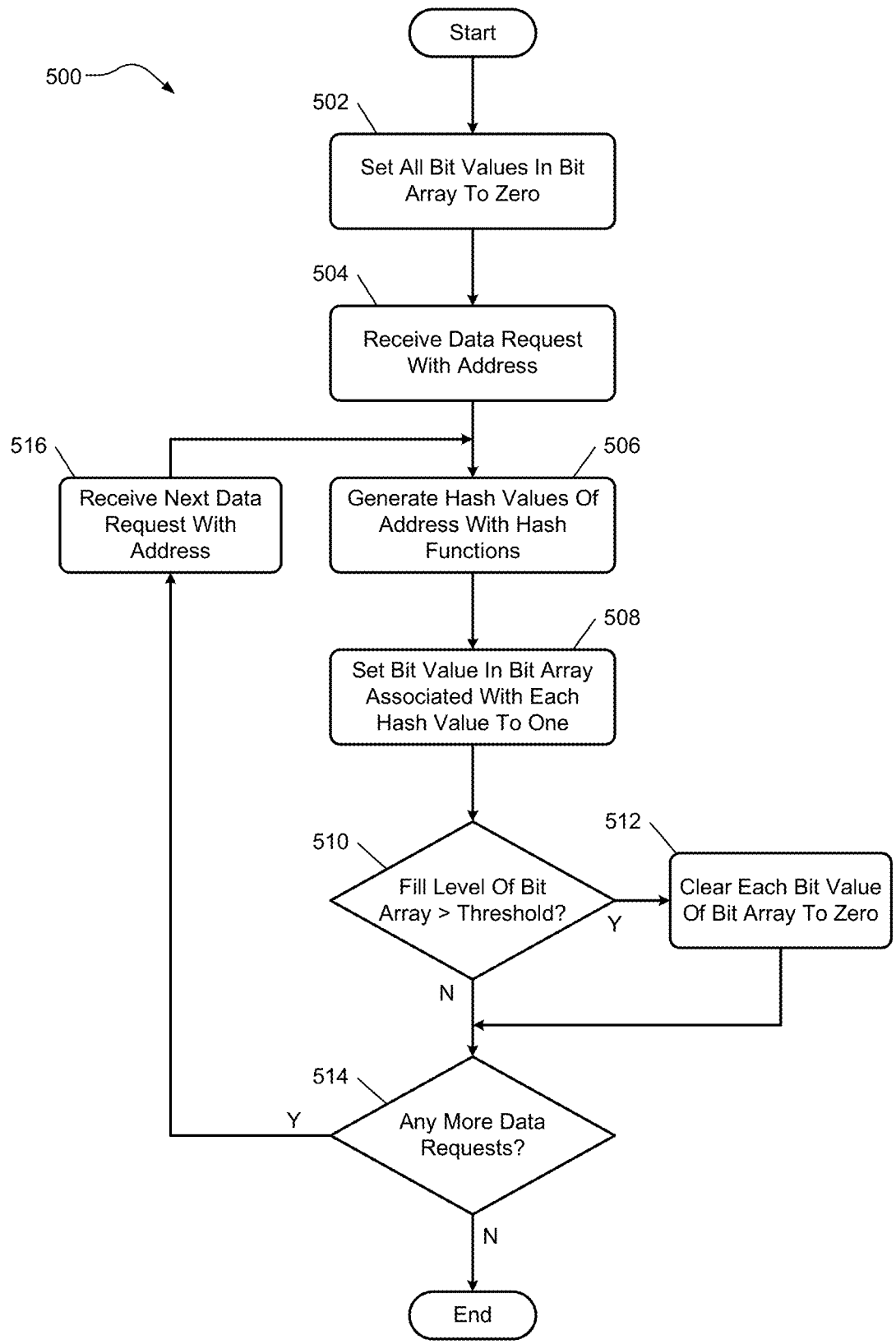
FIG. 5 is a flow diagram of a control method for inserting addresses into a filter and maintaining a desired fill level of the filter, according to example embodiments.
Figure 6:
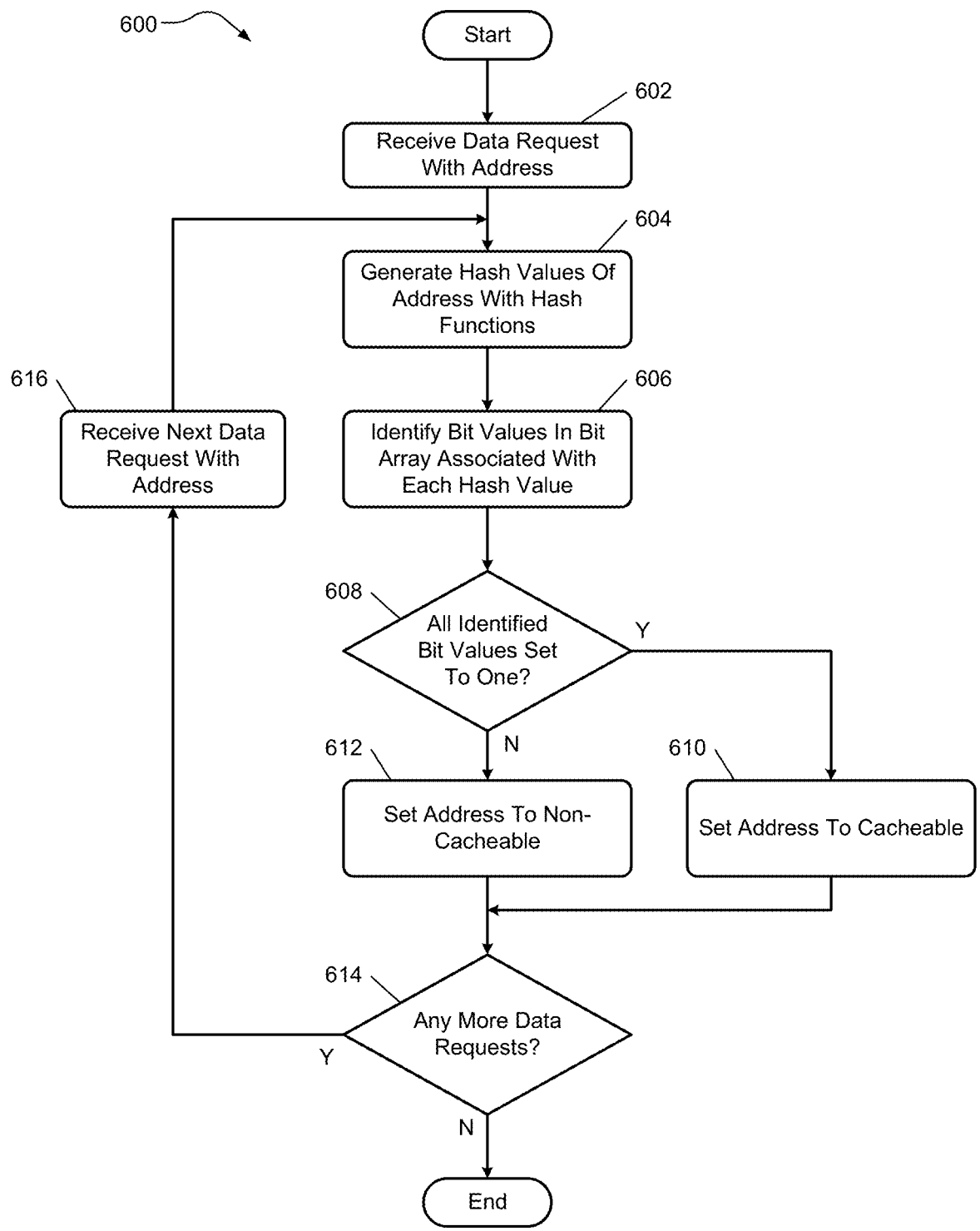
FIG. 6 is a flow diagram of a control method for filtering addresses from a cache according to example embodiments.

FIG. 5 illustrates a control method 500 for inserting addresses into a filter and maintaining a desired fill level of the filter, and FIG. 6 illustrates a control method 600 for filtering addresses from a cache, according to example embodiments. In the examples of FIGS. 5 and 6, the filter includes a bloom filter having a data structure that implements hash functions for inserting entries into a bit array of the data structure as explained above. While the control methods 500, 600 are described with respect to a bloom filter, it should be appreciated that the control methods 500, 600 may be implemented with any other suitable type of filter if desired.

With reference to FIG. 5, the method 500 begins at 502 where the bloom filter sets all bit values in the bit array to zero. For example, at least some of the bit values in the bit array may be set to one based on previously inserted addresses as explained above. In such examples, the bloom filter clears the bit array to a default setting by forcing all of the bit values to zero. Control then proceeds to 504, where the bloom filter receives a data request with an address from a data requester as explained herein.

At 506, the bloom filter generates hash values of the received address based on multiple hash functions. For example, and as explained above, each hash function of the bloom filter receives the address as an input and generates a hashed value falling within a size of the bit array. For instance, if the size of the bit array is ten, each hash function generates a hashed value between one and ten. Control then proceeds to 508.

At 508, the bloom filter sets a bit value in the bit array associated with each hash value generated at 506 to one. For example, if one hash function generates a hashed value of ten based on the received address, the bit value at the tenth index position in the bit array is set to one. Additionally, if a different hash function generates a hashed value of six based on the received address, the bit value at the sixth index position in the bit array is set to one. This is continued for each hash function and resulting hashed value. If multiple hash functions generate the same hashed value, the bit value at that index position in the bit array is set to one. Control then proceeds to 510.

At 510, the bloom filter determines whether a fill level of the bit array in the data structure is greater than a defined threshold, as explained above. For example, the number of ones in the bit array (set based on the hashed values) may correspond to the fill level of the bit array. In such examples, the bloom filter may determine the fill level by summing the number of ones in the bit array. The number of addresses stored in the bloom filter can be approximated as a function of ones stored. In various embodiments, the probability of false positive hits from the bloom filter generally increases as the fill level (e.g., the number of ones) of the bit array increases. This is due to the possibility of any one or more of the hash functions generating the same hashed values for different addresses. Therefore, a balance between the maximum capacity of the bloom filter and the false positive probability may be achieved.

If the fill level of the bit array is greater than the defined threshold at 510, control proceeds to 512. Otherwise, control proceeds to 514. At 512, the bloom filter clears each bit value of the bit array to zero. In other words, the bloom filter clears the bit array to a default setting as explained above. This effectively resets the bloom filter. Control then proceeds to 514. In other embodiments, the bloom filter may clear a portion of the bit values of the bit array. In such examples, the bloom filter may clear a percentage (e.g., 25%, 50%, 75%, etc.) of bit values. In this way, the bloom filter may not fully reset the bit array each time the filter has an overfill level (e.g., exceeding the defined threshold). Instead, the bloom filter may clear a number of the index positions having bit values set to one to move the fill level back below the defined threshold. Other maintenance methods may include removing addresses from the filter based on when the addresses were inserted into the filter. For example, the oldest entries may be removed first. In the case of the bloom filter, such a scheme may generally include regenerating the entire array. In still other embodiments, maintenance methods may implement a sliding bloom filter (e.g., sometimes referred to as a rolling bloom filter) where the bloom filter bit array may be split into sections to be filled with addresses in sequence. The sections can be reset independently of each other as needed. Regardless of whether the bloom filter clears each bit value or a portion of the bit values of the bit array to zero, maintaining the fill level below the defined threshold may improve and/or maximize performance of the filter.

At 514, control determines whether any additional data requests are made by the data requester. If so, control proceeds to 516 where the bloom filter receives the next data request and address. Otherwise, control ends.

As shown in FIG. 6, the method 600 begins at 602 where the bloom filter receives a data request with an address from a data requester as explained herein. Control then proceeds to 604, where the bloom filter generates hash values of the received address based on multiple hash functions. For example, each hash function of the bloom filter generates a hash value falling within a size of the bit array as explained above. Control then proceeds to 606.

At 606, the bloom filter identifies bit values in the bit array associated with the each generated hash value. For example, and as explained above relative to FIGS. 1 and 5, the bit array of the data structure includes index positions with bit values. If three hash functions in the filter generate hashed values of two, six, and ten based on the received address, the bit values at the second, sixth, and tenth index positions are identified. Control then proceeds to 608.

At 608, the bloom filter determines whether all of the bit values identified at 606 are set to one. For example, and as explained above relative to FIGS. 1 and 5, the bloom filter inserts previous received addresses into the data structure by setting the bit values associated with the generated hash values to one. For instance, the bit values at the second, sixth, and tenth index positions of the bit array may be set to one based on previously received addresses. In that example, all of the bit values identified at 606 are set to one, indicating the address has most likely been previously seen by the bloom filter (e.g., taking into account the possibility of false positives). If all of the bit values identified at 606 are set to one, control proceeds to 610 where the bloom filter sets the address to cacheable as explained above. Control then proceeds to 614.

In other examples, the bit values at the second and tenth index positions of the bit array may be set to one based on previously received addresses and the bit value at the sixth index position of the bit array may be set to zero. In this case, not all of the bit values identified at 606 are set to one, indicating the address has not been previously seen by the bloom filter. If not all of the bit values identified at 606 are set to one (e.g., any of the identified bit values are set to zero), control proceeds to 612 where the bloom filter sets the address to non-cacheable as explained above. Control then proceeds to 614.

At 614, control determines whether any additional data requests are made by the data requester. If so, control proceeds to 616 where the bloom filter receives the next data request and address. Otherwise, control ends.

Various example embodiments herein are directed towards improved devices, systems, methods and/or non-transitory computer readable mediums for filtering addresses from caches. For example, in various embodiments, a filter may be implemented (in hardware and/or software) for tracking addresses and/or representations of addresses seen in the past to select specific addresses to put into a cache when requests for the addresses are likely to repeat. With such techniques, one-off addresses are filtered out by the filter and do not pollute the cache, while frequently repeating addresses are promoted to the cache and may remain there for longer periods.

The filtered cache solutions herein may consistently outperform traditional cache approaches. For example, by employing any one of the filtered cache solutions herein, cache evictions may be reduced by a factor of 10 as compared to traditional cache approaches. Additionally, cache hit percents may be increased by 10 to 20 percentage points as compared to traditional cache approaches. As a result of the increased cache hit percents and reduced cache evictions, the cache experiences lower power consumption and reduced cache thrashing as compared to traditional caches.

For example, testing was performed on an example filter cache solution and a traditional cache having the same size (e.g., 256) and receiving a 50,000 long sequence of addresses. The sequence was comprised of addresses obtained by sampling a weighted distribution having, for example, 256 high weighted addresses (e.g., frequently occurring addresses) and 1792 low weighted addresses (e.g., rarely reoccurring addresses). The weights were such that the high weighted addresses made up 70% of the resultant input sequence (see fitness=0.7 as described below). In this example, the filter included a bit array size (m) of 2048, a max number of addresses stored (N) of 213, and 7 hash functions (K). As shown in Table 1 below, the filter cache solution had a cache hit percent of 55%, a score of 0.78 (e.g., cache hit %/fitness), an efficiency of 80%, and 2,000 cache evictions, whereas a traditional cache had a cache hit percent of 41%, a score of 0.59, an efficiency of 57%, and 29,000 cache evictions. Additionally, the observed false positive probability was low. In such examples, the efficiency may be a sum of weights of cached addresses divided by a sum of weights of all possible addresses. A weight as used herein may refer to how often an address occurs in requests (e.g., the higher the weight, the more often an address occurs). Additionally, the fitness may be the proportion of addresses with a higher weight. For example, if the fitness equals 0.7, the higher weighted addresses appear 70% of time as inputs. While the testing described above makes reference to specific metrics, other metrics as well as different test cases can be defined to establish the performance of the filter caches herein in comparison with traditional caches. Universally, the cache hit ratio improves and the number of evictions decreases by using the filter caches herein instead of traditional caches.

TABLE 1

| Results | Traditional Cache | Filter Cache |
| --- | --- | --- |
| Cache hit % | 41% | 55% |
| Score | 0.59 | 0.78 |
| Efficiency | 57% | 80% |
| Cache Evictions | ~29,000 | ~2,000 |

Additionally, the cache filters herein may be designed to maximize results with respect to their associated caches. For example, for a particular cache size, the filter may be setup to give a desirable score. In such examples, the score is an average cache hit percent divided by the fitness over a defined number of iterations (e.g., 10,000 iterations). For instance, testing performed considered cache and filter time windows. An address is cached if it repeats itself before the filter (e.g., the bloom filter) erases it during maintenance (e.g., the fill level exceeds a defined threshold), and a cache hit occurs if an address repeats itself before it gets evicted from the cache (e.g., based on a replacement or caching algorithm). If the filter time window is much greater than the cache time window, cache thrashing occurs as the filter lets in addresses that do not repeat themselves before being evicted. Conversely, if the filter time window is much smaller than the cache time window, only addresses that repeat themselves often are cached, thereby causing the cache to fill slowly. As such, testing has shown that desirable results occur when the time windows of the cache and the filter are the same (or where the time window of the filter slightly larger).

Testing also has shown that the filter (e.g., a bloom filter) may be setup such that it can hold up to the same or similar number of elements as the number of entries in its corresponding cache. For example, an optimal bloom filter for a given cache may have a max number of addresses stored (N) in the vicinity of the size of the cache, with a small false positive probability. In such examples, if two filters have a similar N value but different bit array sizes (m), the larger size filter may perform significantly better due to smaller number of false positives.

Further, testing has shown that implementation of the filtered cache solutions on chips (e.g., silicon chips) is feasible. For example, the performance of the filtered cache solutions generally increases with the size of the filter, but levels off a certain point. In some filter implementation, it may be desirable to have a bloom filter size about 8 to 16 times are larger than the cache size and implement the bloom filter with three hash functions. With such a design, the filtered cache solution may be implemented on a chip while also increasing an average cache hit percent by 8% to 14% and reducing evictions by a factor of 10 as compared to a traditional cache.

Additionally, adding a filter (e.g., a bloom filter) sized according to the example above may result in doubling the effective size of the cache. For example, testing has shown that a cache hit ratio of a smaller cache with a bloom filter is similar to that of a cache twice the size with no bloom filter, and the number of cache evictions is around 10× smaller when the bloom filter is implemented. In various embodiments, if space on a chip is limited, the bloom filter size may be reduced to about 4 times the cache size while still achieving desirable results.

Further, in some embodiments, testing was performed on various example filters to analyze the effects of the cache size which limits the number of addresses that can be physically stored into a cache. In such examples, the testing included input distributions where the number of frequently repeating addresses was lower than, higher than, or the same as the number of addresses that can be stored in the cache. Each input distribution may be referred to as a breakover. For example, testing has shown that with a breakover of less than 1, improved results may be achieved with only a few cached addresses as compared to a traditional cache. With a breakover of more than 1, it may be easier to cache an address that will produce cache hits. However, results may be slightly diminished as the cache may receive too many cacheable addresses, thereby resulting in more evictions. In such examples, testing has shown that a breakover equal to 1 (e.g., the number of frequently repeating addresses was the same as the number of addresses that can be stored in the cache) may be more challenging to obtain a desirable cache scenario as compared to when the breakover is more or less than 1. This is due to there being only a unique combination of contents of the cache that would over time yield the best performance (e.g., in an ideal world every single high weighted address is in the cache and nothing else). As such, when optimizing a filter size and a cache size for implementation, experiments may be undertaken with a breakover input distribution equal to 1.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment or other network elements and/or hardware. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Benefits, other advantages, and solutions to problems have been described above with regard to embodiments of the disclosure. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A system for filtering addresses from a cache memory, the system comprising:
   a filter in communication with a cache memory, the filter including a filter data structure, the filter configured to
   receive a data request including an address specifying a memory location of the requested data,
   in response to the address not being present in the cache memory, query the filter data structure to determine whether the address is cacheable when the address does match one of previously inserted addresses in the filter data structure or non-cacheable when the address does not match one of previously inserted addresses in the filter data structure,
   in response to determining the address is non-cacheable, insert the address into the filter data structure and transmit a signal to the cache memory to prevent caching of the data and the address associated with the data,
   determine a number of addresses in the filter data structure, and
   clear at least a portion of the addresses from the filter data structure in response to the number of addresses exceeding a defined threshold.

2. The system of claim 1, further comprising the cache memory and a cache controller in communication with the cache memory, the cache controller configured to
   receive the data request including the address,
   query the cache memory to determine whether the cache memory includes the address, and
   update a cache state of the cache memory based on the received data request in response to determining the address is present in the cache memory.

3. The system of claim 1, further comprising the cache memory and a cache controller in communication with the cache memory and the filter, the cache controller configured to
   receive the data request including the address,
   query the cache memory to determine whether the cache memory includes the address, and
   cache the data and the address into the cache memory in response to determining the address is not present in the cache memory and the address being cacheable.

4. The system of claim 3, wherein the filter is configured to remove the address from the filter data structure in response to the address being present in the cache memory.

5. The system of claim 4, wherein
   the filter data structure includes a bit array having bit values, and
   the filter is configured to generate hashed values of the address based on a plurality of hash functions, and set a bit value of the bit array associated with each hashed value to one.

6. The system of claim 5, wherein the filter is configured to
   determine a number of addresses in the filter data structure by determining a fill level of the bit array, and
   clear at least a portion of the addresses from the filter data structure by clearing at least portion of the bit values of the bit array to zero in response to the fill level exceeding the defined threshold.

7. The system of claim 1, wherein the filter is configured to
   compare the address associated with the received data request toa set of addresses in the filter data structure,
   identify the address as cacheable in response to the address matching one of the set of addresses, and
   identify the address as non-cacheable in response to the address not matching any address of the set of addresses.

8. The system of claim 1, wherein the filter is a bloom filter.

9. The system of claim 1, wherein the filter is configured to clear all of the addresses from the filter data structure in response to the number of addresses exceeding the defined threshold.

10. A method for filtering addresses from a cache, the method comprising:
    receiving, by a filter, a data request including an address specifying a memory location of the requested data;
    determining that the address is not present in the cache, querying the filter to determine whether the address is cacheable when the address does match one of previously inserted addresses in a filter data structure or non-cacheable when the address does not match one of previously inserted addresses in the filter data structure;
    determining the address is non-cacheable, and inserting the address into the filter and transmitting a signal to the cache to prevent caching of the data and the address associated with the data;

determining a number of addresses in the filter exceeds a defined threshold; and clearing at least a portion of the addresses from the filter in response to the number of addresses exceeding the defined threshold.

11. The method of claim 10, further comprising receiving, by the cache, the data request including the address, querying the cache to determine whether the cache includes the address, and updating a cache state of the cache based on the received data request in response to determining the address is present in the cache.

12. The method of claim 10, further comprising receiving, by the cache, the data request including the address, querying the cache to determine whether the cache includes the address, and caching the data and the address into the cache in response to determining the address is not present in the cache and the address is cacheable.

13. The method of claim 12, further comprising removing the address from the filter in response to the address being present in the cache.

14. The method of claim 13, wherein the filter includes a bit array having bit values, and inserting the address associated with the received data request into the filter includes generating hashed values of the address based on a plurality of hash functions, and setting a bit value of the bit array associated with each hashed value to one.

15. The method of claim 14, wherein determining a number of addresses in the filter includes determining a fill level of the bit array, and clearing at least a portion of the addresses from the filter includes clearing at least portion of the bit values of the bit array to zero in response to the fill level exceeding the defined threshold.

16. The method of claim 10, wherein querying the filter to determine whether the address is cacheable or non-cacheable includes comparing the address associated with the received data request to a set of addresses in the filter, identifying the address as cacheable in response to the address matching one of the set of addresses, and identifying the address as non-cacheable in response to the address not matching any address of the set of addresses.

17. The method of claim 10, wherein inserting the address associated with the received data request into the filter includes inserting the address into the filter in response to preventing caching of the data and the address associated with the data.

18. The method of claim 10, wherein clearing at least the portion of the addresses from the filter includes clearing all of the addresses from the filter in response to the number of addresses exceeding the defined threshold.

19. A non-transitory computer readable medium storing computer readable instructions, which when executed by processing circuitry, causes the processing circuitry to:

receive a data request including an address specifying a memory location of the requested data;

in response to the address not being present in a cache, query a filter to determine whether the address associated with the received data request is cacheable when the address does match one of previously inserted addresses in a filter data structure or non-cacheable when the address does not match one of previously inserted addresses in the filter data structure;

in response to determining the address is non-cacheable, insert the address into the filter and transmit a signal to the cache to prevent caching of the data and the address associated with the data;

determine a number of addresses in the filter; and clear at least a portion of the addresses from the filter in response to the number of addresses exceeding a defined threshold.

20. The non-transitory computer readable medium of claim 19, wherein the processing circuitry is further caused to query the cache to determine whether the cache includes the address, and update a cache state of the cache based on the received data request in response to determining the address is present in the cache.

21. The non-transitory computer readable medium of claim 19, wherein the processing circuitry is further caused to query the cache to determine whether the cache includes the address, and cache the data and the address into the cache in response to determining the address is not present in the cache and the address is cacheable.

* * * * *